US008743535B2

(12) United States Patent
Wennemer et al.

(10) Patent No.: US 8,743,535 B2
(45) Date of Patent: *Jun. 3, 2014

(54) KEYPAD WITH WATER AND DUST PROTECTION

(75) Inventors: Dietmar Frank Wennemer, Waterloo (CA); Chao Chen, Waterloo (CA); Timothy Herbert Kyowski, Waterloo (CA)

(73) Assignee: Blackberry Limited, Waterloo, ON (CA)

( * ) Notice: Subject to any disclaimer, the term of this patent is extended or adjusted under 35 U.S.C. 154(b) by 244 days.

This patent is subject to a terminal disclaimer.

(21) Appl. No.: 13/241,452

(22) Filed: Sep. 23, 2011

(65) Prior Publication Data

US 2012/0013488 A1 Jan. 19, 2012

Related U.S. Application Data

(63) Continuation of application No. 12/050,481, filed on Mar. 18, 2008, now Pat. No. 8,050,019.

(51) Int. Cl.
*G06F 1/16* (2006.01)

(52) U.S. Cl.
CPC .................................. *G06F 1/1662* (2013.01)
USPC ................................ 361/679.08; 361/679.01

(58) Field of Classification Search
CPC ..... G06F 1/1613; G06F 1/1662; G06F 1/203; G06F 21/83; G06F 3/0208; G06F 3/0224; H04K 5/068
USPC ............. 361/679.01, 679.02, 679.08, 679.09, 361/679.21, 679.26, 679.27, 679.55, 361/679.56, 679.3; 248/917–924

See application file for complete search history.

(56) References Cited

U.S. PATENT DOCUMENTS 5,260,532 A * 11/1993 Tinder et al. ............... 200/302.1
5,894,039 A    4/1999 Tsai

FOREIGN PATENT DOCUMENTS

| EP | 1467391 A | 10/2004 |
| EP | 1619703 A | 1/2006 |
| EP | 1737010 A | 12/2006 |
| WO | WO2008018416 A | 2/2008 |

OTHER PUBLICATIONS http://advanced-input.com/AIDpdfDownloads/Sealing6pgs.pdf; Advanced Input Systems; 2004.
http://www.grayhill.com/CustomKeypads/; Grayhill Inc.; 2005.

* cited by examiner

*Primary Examiner* — Anthony Haughton
*Assistant Examiner* — Ingrid Wright
(74) *Attorney, Agent, or Firm* — Bennett Jones LLP

(57) ABSTRACT

A keypad suitable for use with a mobile communication or a handheld device. The keypad includes an actuator component formed from multiple materials and comprises a plurality of actuators, a sealing bead and/or a light guide. The sealing bead is formed from a flexible or compressible material such as silicone rubber. When the keypad is installed the sealing bead is compressed against the mounting surface in the device and provides a seal for the keypad against environmental agents such as moisture, dust and/or electrostatic discharges.

6 Claims, 8 Drawing Sheets

KEYPAD WITH WATER AND DUST PROTECTION

FIELD OF THE APPLICATION

The present application relates to keypads, and more particularly, to a keypad intended for portable or handheld communication devices.

BACKGROUND OF THE APPLICATION

The portability and convenience of mobile or handheld communication devices has resulted in their widespread use and popularity. The portability of handheld communication devices also makes them more susceptible to exposure to outdoor elements and hazards, such as moisture (e.g. rain, sleet, and snow), dust, and other environmental elements.

Accordingly, there remains a need for improvements in the art for keypads.

BRIEF DESCRIPTION OF THE DRAWINGS

Reference will now be made to the accompanying drawings which show, by way of example, embodiments of the apparatus described herein, and how they may be carried into effect, and in which.

Like reference numerals indicate like or corresponding elements in the drawings.

DETAILED DESCRIPTION OF THE EMBODIMENTS

Embodiments according to the present application are generally directed to a keypad assembly and structure configured to provide a seal against environmental elements or agents, such as water/moisture, dust and/or ESD (Electro-Static Discharge).

According to an embodiment, there is provided a keypad suitable for use with a mobile communication device and the mobile communication device includes a mounting substrate, the keypad comprises: a base-frame; a plurality of keys operatively coupled to the base-frame; an actuator component positioned with the base-frame, and the actuator component includes an actuator for each of the keys, and each of the actuators are responsive to depression of an associated one of the keys; and the actuator component includes a sealing bead running along a perimeter portion of the actuator component formed with the actuator component from a flexible material. The sealing bead is compressed against the mounting substrate during installation to provide a seal or barrier against environmental agents.

According to another embodiment, there is provided an actuator component for a keypad, the actuator component comprises: a plurality of actuators and each of the actuators being formed from a first material; a light guide comprising a plastic material co-molded with the plurality of actuators; and a sealing bead formed from the first material, and co-molded with the light guide.

According to another embodiment, there is provided a process for manufacturing a keypad insert, the process comprises: providing a plurality of actuators formed of a first material; providing a light guide formed of a second material; providing a sealing bead formed from the first material; bonding together the plurality of actuators, the light guide and the sealing bead using co-molding.

Figure 1:
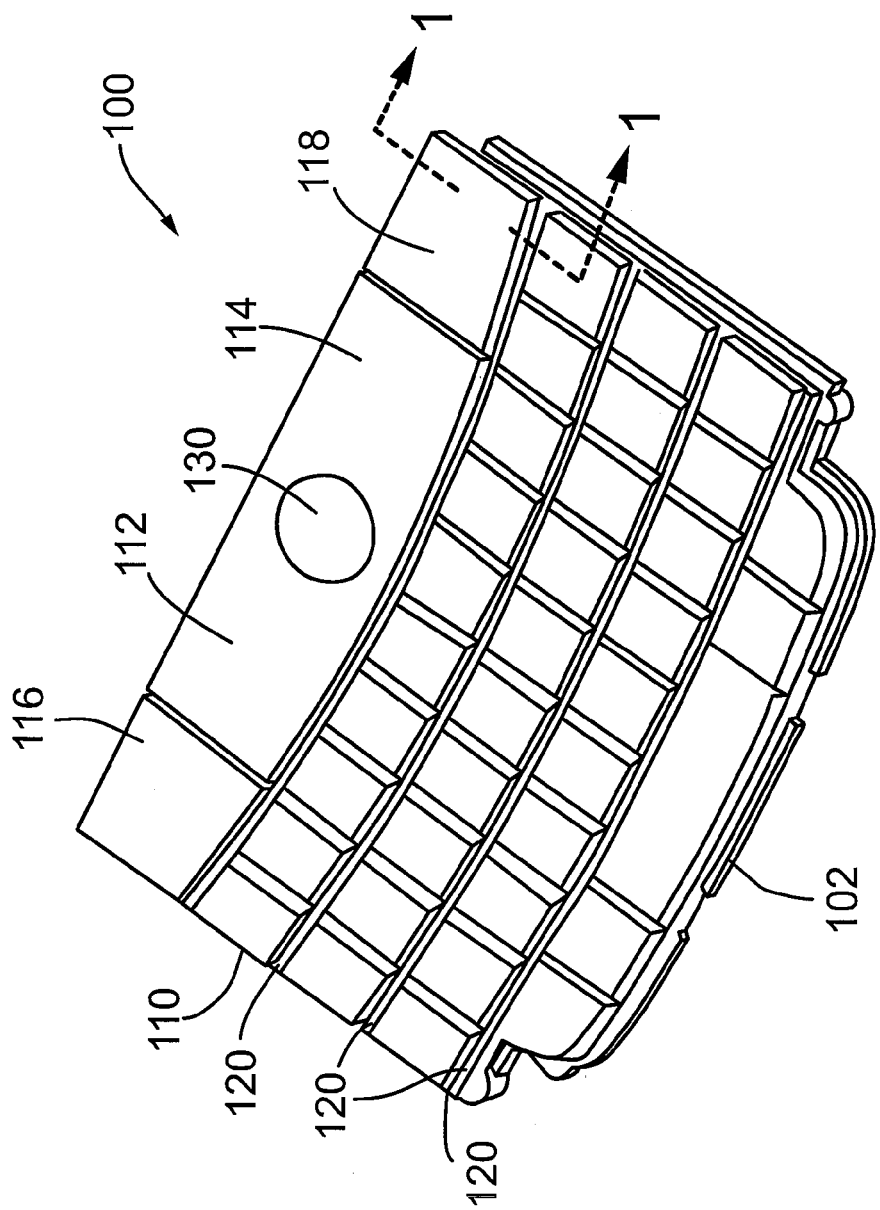
FIG. 1 shows in diagrammatic form a keypad according to an embodiment.
Figure 2:
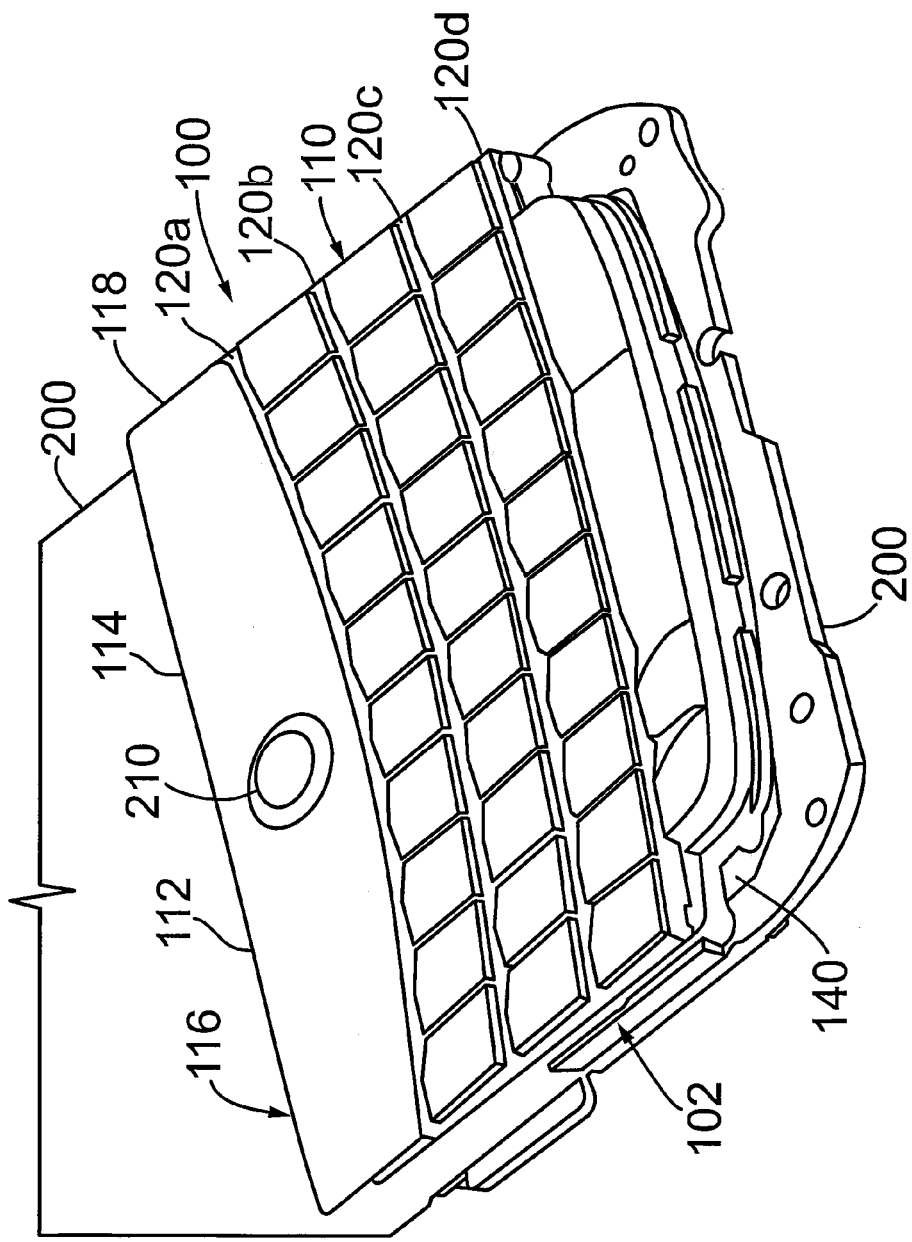
FIG. 2 shows in diagrammatic form the keypad of FIG. 1 mounted on a substrate or carrier component in a communication device.

Reference is made to FIG. 1, which shows in diagrammatic form a keypad assembly according to an embodiment and indicated generally by reference 100. FIG. 2 shows the keypad assembly 100 installed, fitted or otherwise mounted or affixed to a printed circuit board (PCB) or other substrate, carrier or structural member for a communication device (e.g. a mobile or handheld), indicated generally by reference 200. The PCB 200 is configured with key-switches or contacts for the keypad and other electronic components in known manner.

In the figures, like reference numerals indicate like or corresponding elements.

As shown in FIG. 1, the keypad 100 comprises, according to an embodiment, a base-frame or member 102, a plurality of keys indicated by 110, a menu key 112, an ESC key 114, a phone call key 116 and an end phone call key 118. The base-frame or member 102 comprises a structural component which may be formed as a plastic frame (e.g. rigid or semi-rigid), and the keys or groups of keys are operatively coupled to the base frame 102. According to an embodiment the keys are configured as a QWERTY type keypad. As also shown, the keypad 100 may include one or more decoration bars or "frets" 120, indicated individually by references 120a, 120b, 120c and 120d. The frets 120 may be formed as part of the base-frame 102 or attached as separate components. According to another aspect, the keypad assembly may include a socket for a "trackball" (indicated by reference 210 in FIG. 2) or other pointer moving mechanism, indicated generally by reference 130. The keypad 100 (i.e. the base-frame 102) includes an edge structure indicated by reference 140 (FIG. 2). According to an embodiment, the edge structure 140 is configured to function in a light guide.

Figure 3:
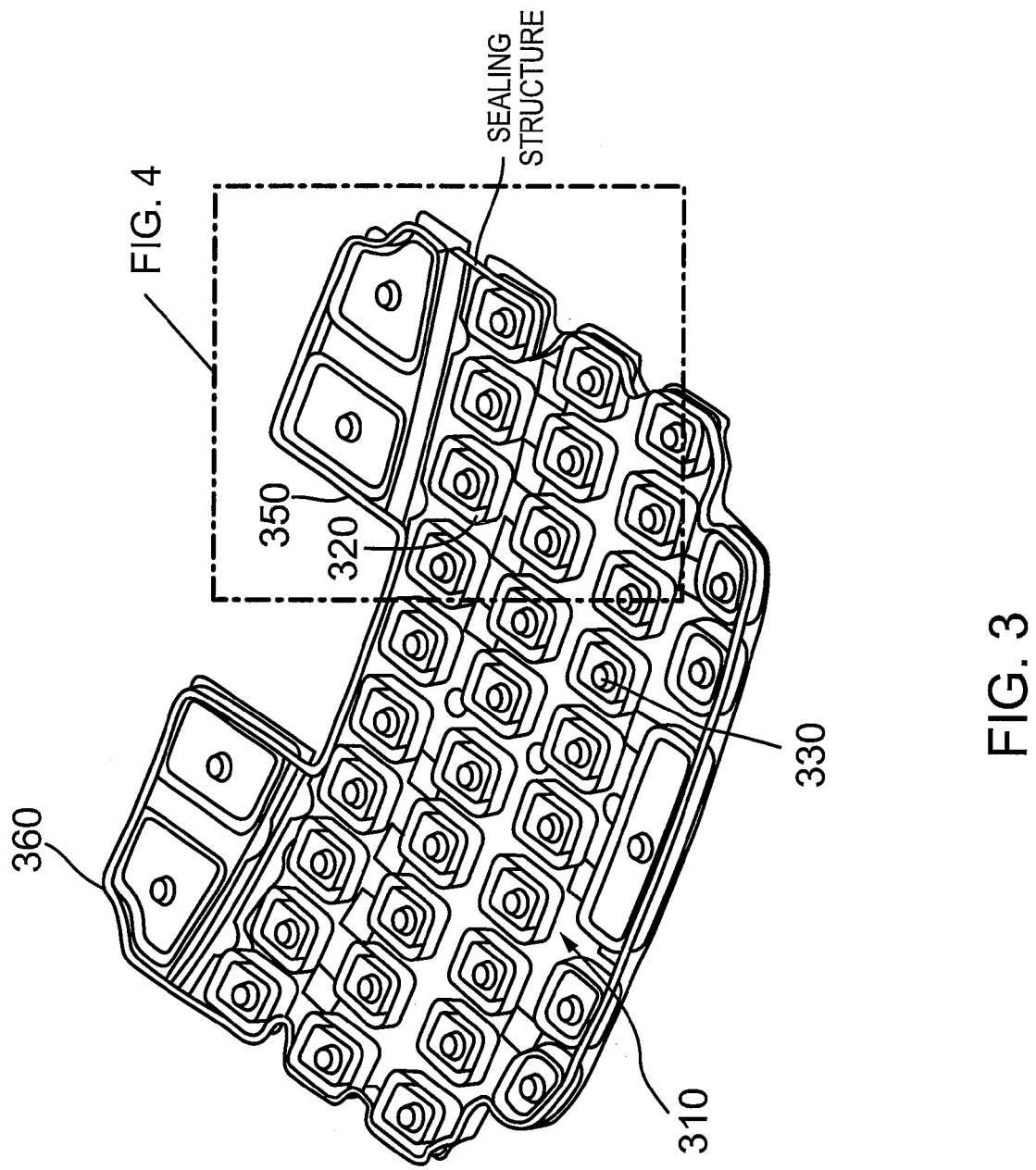
FIG. 3 shows in diagrammatic form a bottom view of a keypad actuator according to an embodiment.
Figure 4:
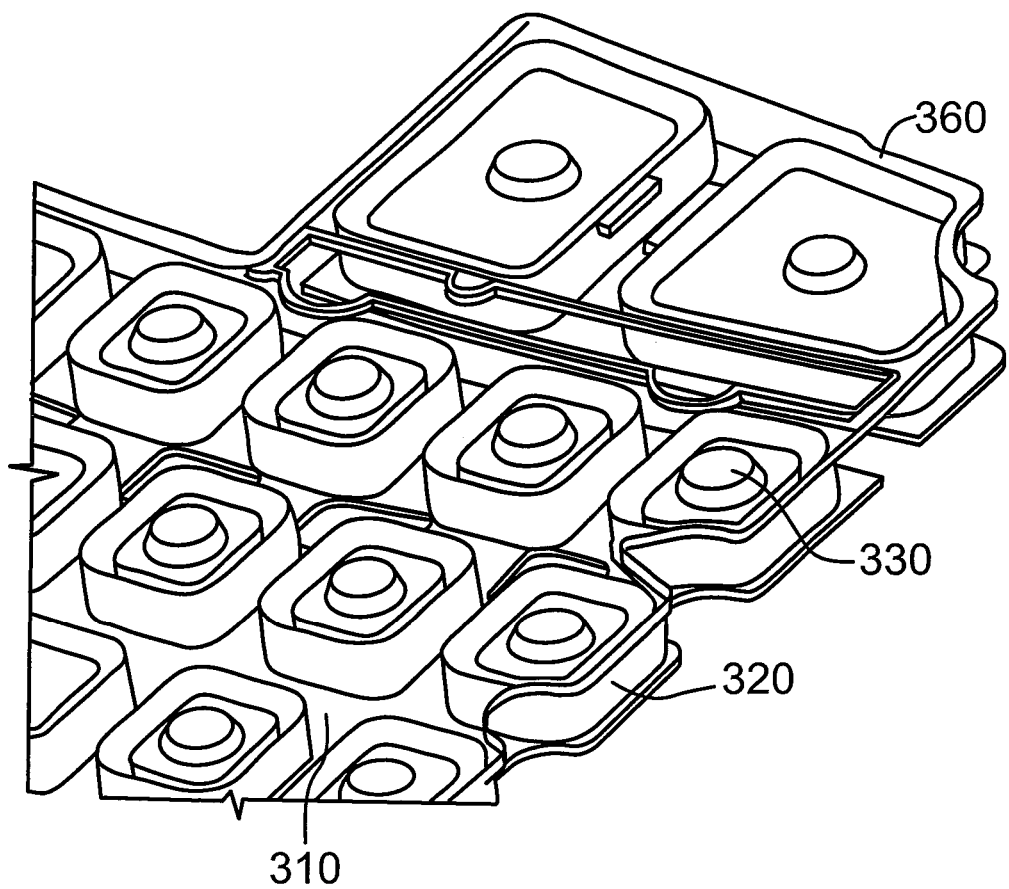
FIG. 4 is a more detailed view of a portion of the keypad actuator depicted in FIG. 3.

Reference is next made to FIGS. 3 and 4, which shows a keypad actuator component or insert according to an embodiment and indicated generally by reference 300 in FIG. 3. The keypad actuator or insert 300 is formed from or comprises multiple materials. According to an embodiment, the keypad actuator 300 comprises a light-guide indicated by reference 310, deflection webs 320 and actuators 330. According to an embodiment, the light-guide 310 is formed from a clear or semi-clear plastic material (rigid or semi-rigid) that is co-molded with a corresponding deflection web 320 and actuator 330 for each of the keys. According to an embodiment, the actuators 330 are formed from a resilient material such as silicone material. The deflection webs 320 have enough inherent stiffness to hold the keys in their correct position when not pressed, and to yield enough when a user exerts a downward force on the key to bring the associated actuator 330 in contact with the corresponding key-switch component on the PCB 200 (FIG. 2).

Figure 8:
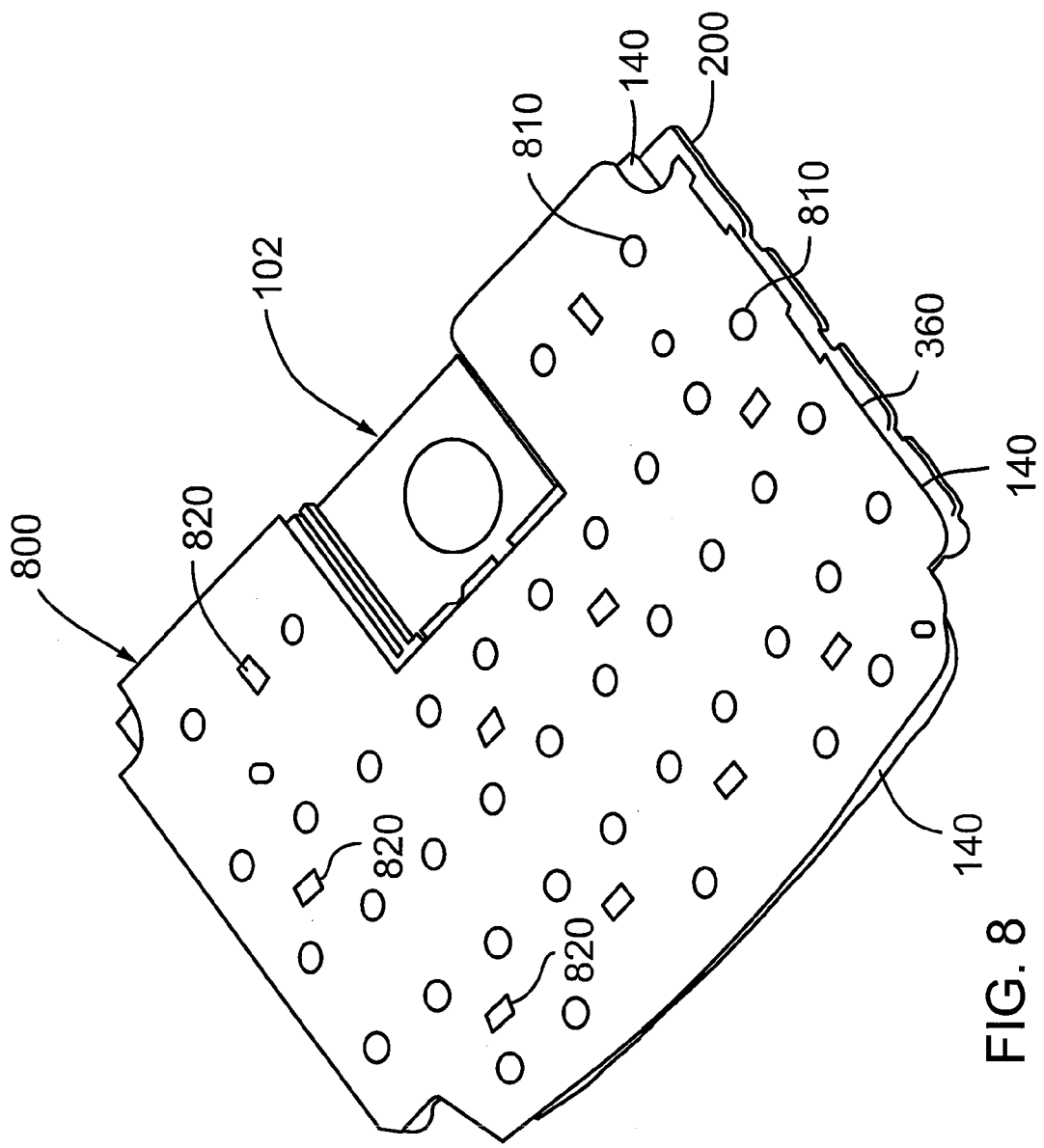
FIG. 8 is a bottom view of the keypad of FIG. 5 with a dome overlay in place.

According to an embodiment, the actuators 330 are formed from a flexible material such as silicone rubber, for example, to provide deflection for tactile feedback to a user. According to an embodiment, each of the actuators 330 comprises a contact dome structure that is configured to function with a dome overlay component, for example, as indicated by reference 800 in FIG. 8. The dome overlay component 800 provides the interface between the keypad 100 and the PCB 200. The dome overlay component 800 includes key-switches indicated by reference 810 for each of the actuators 330 (FIG. 3). The key-switches 810 are configured to generate a keypad signal on the PCB 200 in response to the depression of the associated actuator 330 and key 110 (FIG. 1) on the keypad 100. The dome overlay 800 also includes openings or cut-outs for LEDs configured to provide a backlighting source.

Referring back to FIGS. 3 and 4, the keypad actuator or insert 300 includes a sealing structure indicated by reference 360. According to an embodiment, the sealing structure 360 comprises a continuous bead, protrusion or raised ridge which runs around the perimeter of the keypad actuator 300 as depicted in FIG. 3. According to an embodiment, the sealing structure 360 is formed from a resilient or a compressible material, such as silicone rubber. According to an embodiment, the silicon rubber for the sealing structure or ridge 360 is co-molded in the keypad actuator or insert 300, which comprises the light-guide 310, the deflection webs 320 and the actuators 330. In an implementation, the sealing structure 360 is formed from silicone rubber with a height in the range of 0.05 to 0.15 mm and a width in the range of 0.3 to 3.0 mm, although it will be appreciated that other dimensions may be utilized to suit the application. The height of the sealing structure 360 is taken as the height above the edge of the keypad, i.e. the surface of the edge structure 140, for example, as depicted in FIG. 7.

Figure 5:
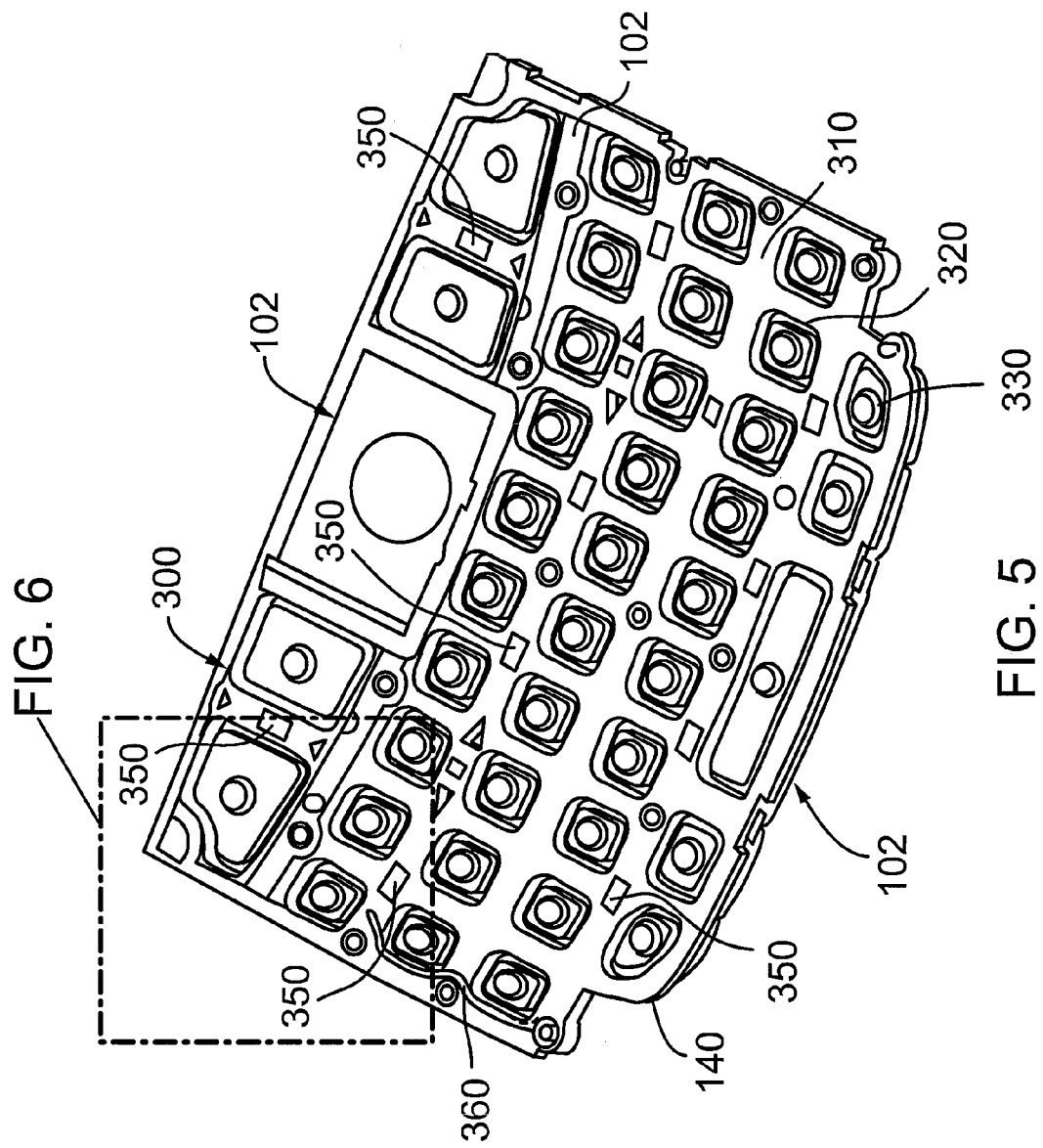
FIG. 5 is a bottom view of the keypad of FIG. 1.
Figure 6:
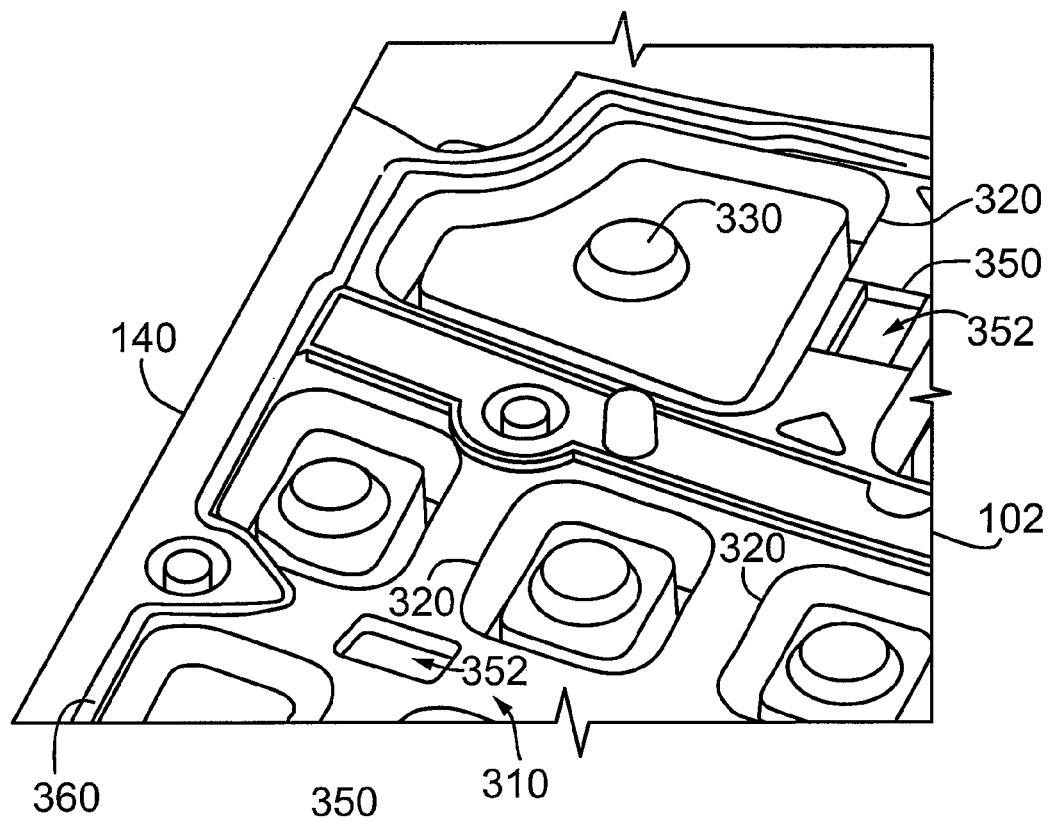
FIG. 6 is a more detailed view of a portion of the keypad of FIG. 5.

Reference is next made to FIGS. 5 and 6, which show a bottom view of the keypad 100 with the keypad actuator or insert 300 in place. As shown, the keypad actuator 300 includes backlight pockets or sockets indicated by reference 350. The backlight pockets 350 receive a light source 352 (e.g. a light emitting diode or LED). The LEDs 352 are mounted on and powered from the PCB 200 (FIG. 2). According to an embodiment, the keys in the keypad 100 comprise transparent or semi-transparent keycaps that permit passage of light from the light sources 352 to provide a lighted keypad. To prevent light from the backlighting sources (i.e. the LEDs) from leaking outside the edges or periphery of the keypad, the base-frame 102 includes the edge structure 140 which serves to provide a backlight shielding function. According to an embodiment, the edge structure 140 comprises a dark (e.g. black) plastic edge that runs substantially around the perimeter of the keypad 100 or base-frame 102 and functions to block the transmission of light emitted by the light source(s) for backlighting the keypad. The edge structure 140 also serves to define a cavity or compartment which can assist in the positioning and/or insertion of the keypad actuator layer 300.

Figure 7:
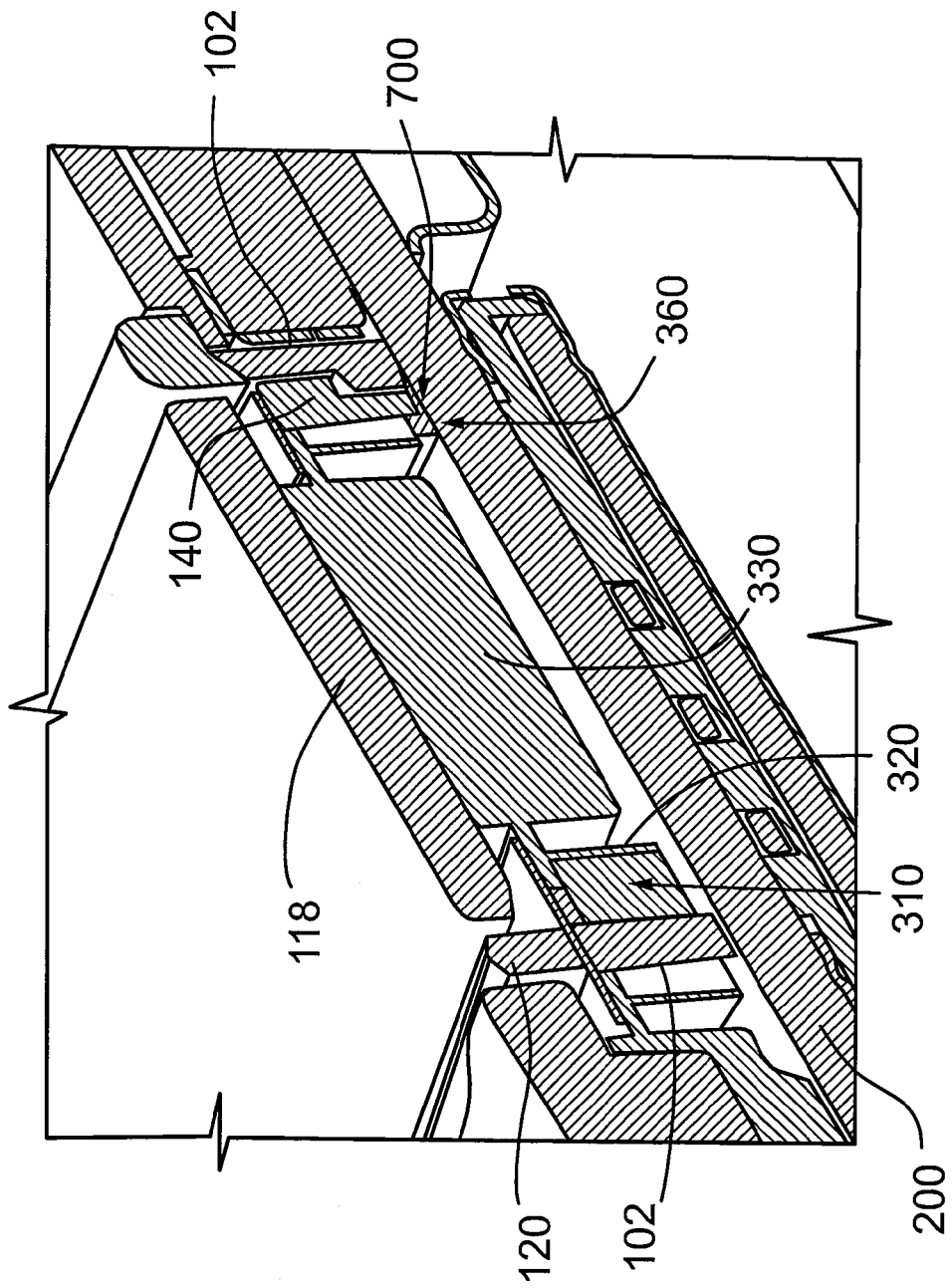
FIG. 7 is a partial cross-sectional view of the keypad taken along line 1-1 of FIG. 1.

Reference is next made to FIG. 7, which shows the configuration of the sealing structure 360 in more detail. As shown in FIG. 7, the sealing structure 360 rests on the surface of the PCB 200. A sealing structure 360 formed from silicone rubber allows the seal 360 to be compressed against the surface of the PCB 200, which serves to improve the sealing properties. According to an embodiment, the keypad 100 includes a space (i.e. a channel or gap) indicated by reference 700. The space or gap 700 runs along the sealing structure 360 and is formed between the edge 140 and the dome overlay. The gap 700 provides a space to allow the sealing structure to be compressed when the keypad is assembled, i.e. a force applied during the keypad assembly procedure. According to an embodiment, the gap 700 has a height in the range of 0.05 to 0.10 mm. although it will be appreciated that other dimensions may be appropriate.

According to an aspect, the sealing structure 360 when compressed against the surface of the PCB 200, for example, as depicted in FIG. 7, provides a seal or barrier to prevent the entry of moisture and/or dust and/or electrostatic discharge into the keypad 100.

In accordance with an embodiment, the keypad actuator 300 is formed from multiple materials using a co-molding process. For example, the deflection webs 320, the actuators 330 and the sealing bead or protrusion 360 are formed from a first resilient or a compressible material such as silicone rubber, and the light guide 310 is formed from a second material such as a rigid or semi-rigid plastic material. According to an embodiment, this allows the sealing bead or protrusion to be formed at the same time as the actuators 330 and an integral element of the keypad actuator 300.

The keypad 100 may be installed or implemented with a mobile communication device. The mobile communication device comprises electronic circuitry and components configured and/or assembled on the PCB 200. The electronic circuitry includes a central processing unit or CPU, which operates under the control of a program (i.e. firmware or software) stored in program memory. The CPU is also provided with data memory. The CPU is operatively coupled to the keypad 100 and the trackball 210 (FIG. 2), i.e. input devices, a display module and an audio transducer or speaker. In addition to the program executable code provided for performing the functions associated with the operation of the mobile communication device, the program memory may include other applications, such as a browser program. The mobile communication device also includes circuitry for wireless communication with a wireless network. The particular implementation details of the mobile communication device will be within the understanding of those skilled in the art, and are therefore not described in further detail.

While the embodiments according to the present application have been described in the context of mobile communication devices, the embodiments may be extended or find application in other types devices having a keypad or keys.

The keypad according to the present application may be embodied in other specific forms without departing from the spirit or essential characteristics thereof. Certain adaptations and modifications of the keypad will be obvious to those skilled in the art. Therefore, the presently discussed embodiments are considered to be illustrative and not restrictive, and the scope being indicated by the appended claims rather than the foregoing description, and all changes which come within the meaning and range of equivalency of the claims are therefore intended to be embraced therein.

The invention claimed is:

1. A keypad suitable for use with a mobile communication device having a mounting substrate, the keypad comprising:
   a base-frame;
   a plurality of keys operatively coupled to said base-frame;
   an actuator component positioned with said base-frame and having an actuator for each of said plurality of keys, each of said actuators being responsive to depression of an associated one of said keys;
   said actuator component having a sealing bead running along a perimeter portion of said actuator component and being formed of a compressible material; and
   said base-frame having a perimeter edge defining a gap between said base-frame and the mounting substrate, said gap being configured for compressing at least a portion of said sealing bead against the mounting substrate.

2. The keypad as claimed in claim 1, wherein said actuator component is formed from two or more materials, and said sealing bead is formed from one of said materials.

3. The keypad as claimed in claim 1, wherein said sealing bead is co-molded with said actuator component.

4. The keypad as claimed in claim 3, wherein said sealing bead comprises a silicone rubber material co-molded with said actuator component.

5. The keypad as claimed in claim 1, wherein said sealing bead has a height dimension in the range of 0.05 mm to 0.15 mm.

6. The keypad as claimed in claim 1 in combination with a mobile communication device, said mobile communication device comprising a display module and an electronic circuit responsive to said keypad and being configured for operating said display module and another electronic circuit configured for wireless communication.

* * * * *